United States Patent
Pfingst et al.

(10) Patent No.: US 9,669,695 B2
(45) Date of Patent: Jun. 6, 2017

(54) ASSEMBLY MOUNT FOR THE MOVABLE FASTENING OF A MOTOR VEHICLE ASSEMBLY, AND METHOD FOR THE MOUNTING OF A MOTOR VEHICLE ASSEMBLY

(71) Applicant: Dr. Ing. h.c. F. Porsche Aktiengesellschaft, Stuttgart (DE)

(72) Inventors: Jan Pfingst, Schömberg (DE); Patrick Scheib, Hemsbach (DE); Christian Lange, Wiernsheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/932,431

(22) Filed: Nov. 4, 2015

(65) Prior Publication Data

US 2016/0138670 A1    May 19, 2016

(30) Foreign Application Priority Data

Nov. 17, 2014    (DE) .................. 10 2014 116 754

(51) Int. Cl.
*F16F 13/00*    (2006.01)
*B60K 5/12*    (2006.01)
(Continued)

(52) U.S. Cl.
CPC .......... *B60K 5/1208* (2013.01); *F16F 13/102* (2013.01); *F16F 13/26* (2013.01)

(58) Field of Classification Search
CPC .. F16F 13/08; F16F 13/10; F16F 13/16; F16F 13/18; F16F 13/22; F16F 13/26; F16F 2228/00
(Continued)

(56) References Cited

U.S. PATENT DOCUMENTS 4,637,584 A * 1/1987 Takehara ............ F16F 13/22
                                                    180/300
5,639,073 A * 6/1997 Suzuki .................. F16F 13/26
                                                    267/140.13
(Continued)

FOREIGN PATENT DOCUMENTS

| DE | 3719435 | 12/1987 |
|---|---|---|
| DE | 102007057873 | 6/2009 |
| DE | 102009026713 | 12/2010 |

OTHER PUBLICATIONS

German Search Report for German Application No. 10 2014 116 754.6 mailed Aug. 25, 2015, including partial translation.

*Primary Examiner* — Christopher Schwartz
(74) *Attorney, Agent, or Firm* — RatnerPrestia

(57) ABSTRACT

An assembly mount for the movable fastening of a motor vehicle assembly (such as an engine) having a housing which is connectable to a motor vehicle body, a fastening bolt which is connectable to the motor vehicle assembly and which projects into the housing via a housing opening, a load-bearing spring which is connected to the housing and to the fastening bolt, wherein the load-bearing spring permits at least a relative movement of the fastening bolt in an opening plane of the housing opening within the housing opening, and a compensation element which is movable relative to the housing and relative to the fastening bolt and which serves for the variation of a movement clearance of the fastening bolt in the housing opening in the opening plane.

10 Claims, 2 Drawing Sheets

Figure 1:
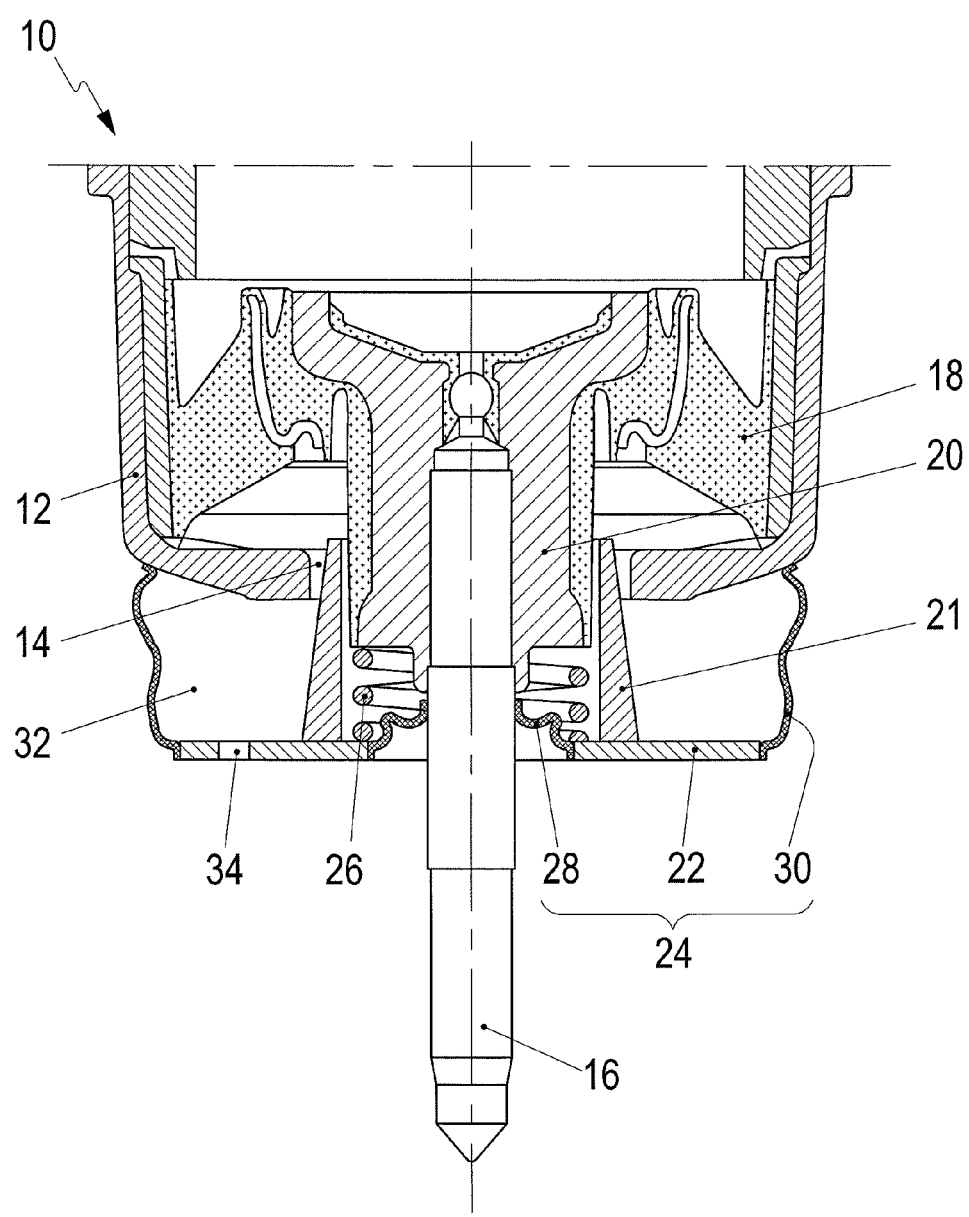

(51) Int. Cl.
*F16F 13/10* (2006.01)
*F16F 13/26* (2006.01)

(58) Field of Classification Search
USPC ..... 267/141.1–141.7, 293; 296/35.1, 190.07; 248/635
See application file for complete search history.

(56) References Cited

U.S. PATENT DOCUMENTS

| | | | | |
|---|---|---|---|---|
| 5,642,873 A * | 7/1997 | Kato | ........................ | F16F 13/26 267/140.14 |
| 5,947,455 A * | 9/1999 | Mikasa | ..................... | B60G 7/02 267/140.13 |
| 6,422,546 B1 * | 7/2002 | Nemoto | ................... | F16F 13/26 267/140.13 |
| 2001/0032919 A1 * | 10/2001 | Hagino | ................. | F16F 13/264 248/562 |
| 2006/0163785 A1 * | 7/2006 | Goudie | ................. | F16F 13/103 267/141.5 |
| 2011/0101582 A1 * | 5/2011 | Kanaya | ................... | F16F 13/18 267/140.14 |
| 2012/0061890 A1 * | 3/2012 | Goudie | ................... | F16F 13/16 267/140.11 |

* cited by examiner

ASSEMBLY MOUNT FOR THE MOVABLE FASTENING OF A MOTOR VEHICLE ASSEMBLY, AND METHOD FOR THE MOUNTING OF A MOTOR VEHICLE ASSEMBLY

CROSS-REFERENCE TO RELATED APPLICATIONS

This application claims priority to German Patent Application No. DE 10 2014 116 754.6, filed Nov. 17, 2014, which is incorporated by reference herein in its entirety.

FIELD OF THE INVENTION

The invention relates to an assembly mount for the movable fastening of a motor vehicle assembly, in particular motor vehicle engine, and to a method for the mounting of a motor vehicle assembly, in particular motor vehicle engine, which is fastened to a motor vehicle body of a motor vehicle by way of at least one assembly mount of this type, in the case of which the motor vehicle assembly can be fastened in the motor vehicle with an adequate clearance, for example for the compensation of thermal expansion effects during the operation of the motor vehicle.

BACKGROUND OF THE INVENTION

DE 10 2009 026 713 A1, which is incorporated by reference herein, discloses an assembly mount for the fastening of a motor vehicle engine, in the case of which assembly mount a fastening bolt which is fastenable to the motor vehicle engine is connected to a housing, so as to be relatively movable in all coordinate directions, by way of an elastomer block. The fastening bolt projects into the housing via a housing opening provided in the housing. Within the housing opening there is provided a buffer unit which extends around the fastening bolt and which is connected to the housing by way of an elastomer material, such that a lateral abutment of the fastening bolt within the housing opening can be dampened by way of the buffer unit.

There is a constant demand for reducing mechanical loading on motor vehicle assemblies in a motor vehicle.

SUMMARY OF THE INVENTION

Measures are specified which make it possible to realize a low mechanical loading of motor vehicle assemblies in a motor vehicle.

According to aspects of the invention, there is provided an assembly mount for the movable fastening of a motor vehicle assembly, in particular motor vehicle engine, having a housing which is connectable to a motor vehicle body, a fastening bolt which is connectable to the motor vehicle assembly and which projects into the housing via a housing opening, a load-bearing spring which is connected to the housing and to the fastening bolt and which is in particular in the form of an elastomer block, wherein the load-bearing spring permits at least a relative movement of the fastening bolt in an opening plane of the housing opening within the housing opening, and a compensation element which is movable relative to the housing and relative to the fastening bolt and which serves for the variation of a movement clearance of the fastening bolt in the housing opening in the opening plane.

In particular if it is the intention for the motor vehicle assembly to be the motor vehicle engine of the motor vehicle, thermal expansion of the motor vehicle engine between the situation in which the motor vehicle engine is cold and the situation in which the motor vehicle engine has warmed at operating temperature can give rise to a considerable change in the relative position of the fastening bolt, which is connected to the motor vehicle engine, relative to the housing. Owing to the relative mobility of the fastening bolt in the opening plane of the housing opening and/or perpendicular to the opening plane of the housing opening in the longitudinal direction of the fastening bolt, the fastening bolt can deflect to a limited extent if, in particular owing to thermal expansion effects, the relative position of the fastening bolt, which is connected to the motor vehicle assembly, with respect to the housing changes. This can however have the effect that, for the motor vehicle assembly, a clearance remains which, in particular in the event of sudden lateral accelerations, can lead to undesired changes in position and/or noisy abutment, for example of the fastening bolt against the housing opening. For example, a sudden lateral change in position of the motor vehicle engine can cause coupling of torque-transmitting components in an unfavorable relative position, which can lead to increased mechanical loads and noise generation.

By means of the movable compensation element, the present clearance of the fastening bolt in the housing opening can be reduced or even eliminated at a desired point in time. For example, after the motor vehicle engine has reached operating temperature, and no further thermal expansion is to be expected, the clearance of the fastening bolt in the housing opening can be at least reduced by the compensation element, such that a relative movement of the motor vehicle engine in the event of suddenly occurring lateral forces, in particular centrifugal forces or inertial forces during cornering or swerving maneuvers of the motor vehicle, can be reliably prevented. Furthermore, in the event of present and/or expected lateral forces of adequate magnitude being detected, it is possible by way of the movable compensation element for the clearance to be briefly eliminated and subsequently restored while the motor vehicle engine is still in the process of warming up to operating temperature. In particular, the compensation element between the fastening bolt and the housing can be moved into the housing opening in order to reduce the clearance. Here, the compensation element can act as a preferably elastically damping lateral stop for the fastening bolt and/or the housing. To prevent undesired relative movements of the motor vehicle assembly, the movable compensation element can be moved into the housing opening in order to reduce the movement clearance of the fastening bolt, such that it is made possible to realize low mechanical loading of motor vehicle assemblies in a motor vehicle.

The load-bearing spring can permit an adequate relative movement of the fastening bolt with respect to the housing, in particular in all coordinate directions. The load-bearing spring is in particular capable of fully dissipating to the housing the loads that are introduced via the fastening bolt. In particular, the load-bearing spring has an elastomer material which is preferably reinforced with a rigid core, for example a steel insert. The steel insert is in particular at least partially insert-molded into the elastomer material. The steel insert is preferably fastened to the fastening bolt, such that in particular, the fastening bolt can be connected to the load-bearing spring by way of a steel-on-steel connection. The housing may be connected directly or indirectly to the motor vehicle body, in particular to a load-bearing structure of the motor vehicle body. The housing preferably forms a control chamber which adjoins the load-bearing spring, wherein the control chamber is provided in particular on that side of the load-bearing spring which points away from the fastening bolt. The control chamber can be partially delimited by the load-bearing spring. It is preferably possible for the pressure within the control chamber to be varied for example hydraulically or pneumatically, whereby the spring characteristic of the load-bearing spring can be influenced. In particular, it is also possible by way of the assembly mount for one motor vehicle assembly to be fastened to another motor vehicle assembly, for example for an oil pump to be fastened to a motor vehicle engine. The opening plane is to be understood to mean a flat plane in which the housing opening of the housing is arranged and perpendicular to which a normal to the area of the housing opening is arranged. In particular, the opening plane is situated in a radial plane of the fastening bolt, wherein it is basically also possible for the fastening bolt to run obliquely with respect to the opening plane. An obliquity of the fastening bolt relative to the opening plane is preferably so slight as to be negligible. In particular, the fastening bolt has, on its end which projects out of the housing, an external thread by which the assembly mount can be screwed to the motor vehicle assembly.

In particular, the compensation element is displaceable in the longitudinal direction of the fastening bolt, wherein the compensation element has a cross section which varies in the longitudinal direction. The compensation element may for example be shaped similarly to a wedge and/or may at least partially have a wedge-shaped cross section. When the compensation element does not project at all, or projects only with a wedge tip, into the housing opening, a large clearance for the fastening bolt can be provided. After an in particular linear or spiral-shaped movement of the compensation element in the longitudinal direction, the compensation element can project with a relatively wide region, which is further remote from the wedge tip, into the housing opening, and thereby reduce or even eliminate the clearance for the fastening bolt. The clearance of the fastening bolt in the housing opening can be adjusted as required in a rapid and inexpensive manner by way of a movement which is easy to implement in terms of construction.

The compensation element is preferably designed as a sleeve which surrounds the fastening bolt and which has an outer diameter which varies in the longitudinal direction, wherein in particular, the compensation element has a wall which is wedge-shaped and/or stepped in the longitudinal direction. The compensation element is in particular designed as a hollow cone or hollow truncated cone, wherein the compensation element preferably has a guide opening which runs in the longitudinal direction of the fastening bolt and which is in particular cylindrical and through which the fastening bolt can be led. The compensation element can thereby be guided on the fastening bolt in the longitudinal direction, and in particular can be attached to the fastening bolt in captive fashion and so as to be relatively movable in the longitudinal direction.

The compensation element is particularly preferably connected to a pressure chamber wall, wherein the pressure chamber wall can be moved relative to the housing and relative to the fastening bolt, in particular in the longitudinal direction of the fastening bolt, hydraulically and/or pneumatically by the application of a positive pressure and/or negative pressure. By means of the movable, in particular at least partially flexible, pressure chamber wall, the pressure chamber wall can move when a pressure within a pressure chamber delimited by the pressure chamber wall changes. Owing to the connection of the pressure chamber wall to the compensation element, it is possible here for the compensation element, which is preferably guided on the fastening bolt, to be jointly moved simultaneously in order to adapt the clearance of the fastening bolt in the housing opening. The pressure on the pressure chamber wall can be changed particularly rapidly, such that it is also possible for the compensation element to be moved in reaction to the pressure change, whereby, in a particular detected situation, it is possible for undesired relative movements of the motor vehicle assembly to be particularly rapidly prevented.

In particular, the compensation element is connected to a holding plate, which has a connection opening for the connection of a pressure medium, of the pressure chamber wall, wherein the fastening bolt extends through a passage opening of the holding plate, wherein a flexible inner bellows for sealing off the passage opening is connected to the fastening bolt and to the holding plate, and a flexible outer bellows for sealing off a pressure chamber which is delimited by the pressure chamber wall is connected to the holding plate and to the housing. The holding plate may be produced from an adequately stable and non-flexible material, such that a pressure port can be connected to the passage opening of the holding plate with an adequate sealing action. The holding plate may for this purpose have a suitable connection piece which is for example equipped with a thread and which forms the passage opening. The holding plate can, with adequate sealing action, be connected by way of the flexible inner bellows to the fastening bolt and by way of the flexible outer bellows to the housing, wherein an adequate relative movement of the holding plate, and in particular of the compensation element that is fastened to the holding plate, can be permitted by means of the inner bellows and the outer bellows. By way of the passage opening of the holding plate, the fastening bolt can project out of a pressure chamber delimited by the pressure chamber wall, and can be fastened, outside the pressure chamber, to the motor vehicle assembly.

A pressure chamber within the housing, which pressure chamber is delimited by the pressure chamber wall, is preferably sealed off by the load-bearing spring. The load-bearing spring may thereby delimit one side of the pressure chamber, such that the pressure chamber wall only has to delimit a correspondingly relatively small region of the pressure chamber. In particular, it is possible for the housing to likewise delimit a part of the pressure chamber. The material usage for the pressure chamber wall can thereby be kept low.

It is particularly preferable for a restoring spring which acts on the compensation element to be provided for positioning the compensation element into a defined initial position, wherein in particular, the restoring spring is supported indirectly or directly on the fastening bolt or on the housing. In particular, in the defined initial position, the clearance, provided by the compensation element, of the fastening bolt in the housing opening is set to a maximum. In the initial position, ambient pressure may prevail in the pressure chamber, such that it is not necessary to maintain a particular positive pressure or negative pressure in the initial position. In this way, energy usage can be kept low, and/or the pressure regulation in the pressure chamber can be simplified.

In particular, the load-bearing spring projects into the housing opening. The load-bearing spring can thereby simultaneously provide lateral damping of the fastening bolt in the housing opening, such that unnecessary noise emissions owing to a hard abutment of the fastening bolt in the housing opening can be prevented.

The invention also relates to a method for the mounting of a motor vehicle assembly, in particular motor vehicle engine, which is fastened to a motor vehicle body of a motor vehicle by way of at least one assembly mount which may be designed and refined as described above, in which method, below a threshold value for lateral forces presently acting and/or expected to act on the motor vehicle assembly, a relatively large clearance of the fastening bolt in the housing opening is provided in the assembly mount, and above a threshold value for lateral forces presently acting and/or expected to act on the motor vehicle assembly, a relatively small clearance of the fastening bolt in the housing opening is provided in the assembly mount, wherein in particular, a clearance of the fastening bolt in the housing opening is eliminated. To prevent undesired relative movements of the motor vehicle assembly, the movable compensation element of the assembly mount can, in order to reduce the movement clearance of the fastening bolt, be moved into the housing opening, such that it is made possible to realize low mechanical loading of motor vehicle assemblies in a motor vehicle.

In particular, the lateral forces presently acting and/or expected to act on the motor vehicle assembly are determined with the aid of a measurement of a steer input angle of a motor vehicle steering wheel and/or a measurement of a yaw rate and/or pitch rate and/or roll rate of the motor vehicle. In this way, it is possible for the sudden onset of cornering and/or possible swerving situations of the motor vehicle and/or oblique positions of the motor vehicle relative to the direction of gravitational force to be identified in good time, and for relative movements of the motor vehicle assembly caused not by thermal expansion effects but by gravitational forces and/or inertial forces to be prevented in good time by way of a temporary reduction of the clearance of the fastening bolt in the housing opening.

Figure 2:
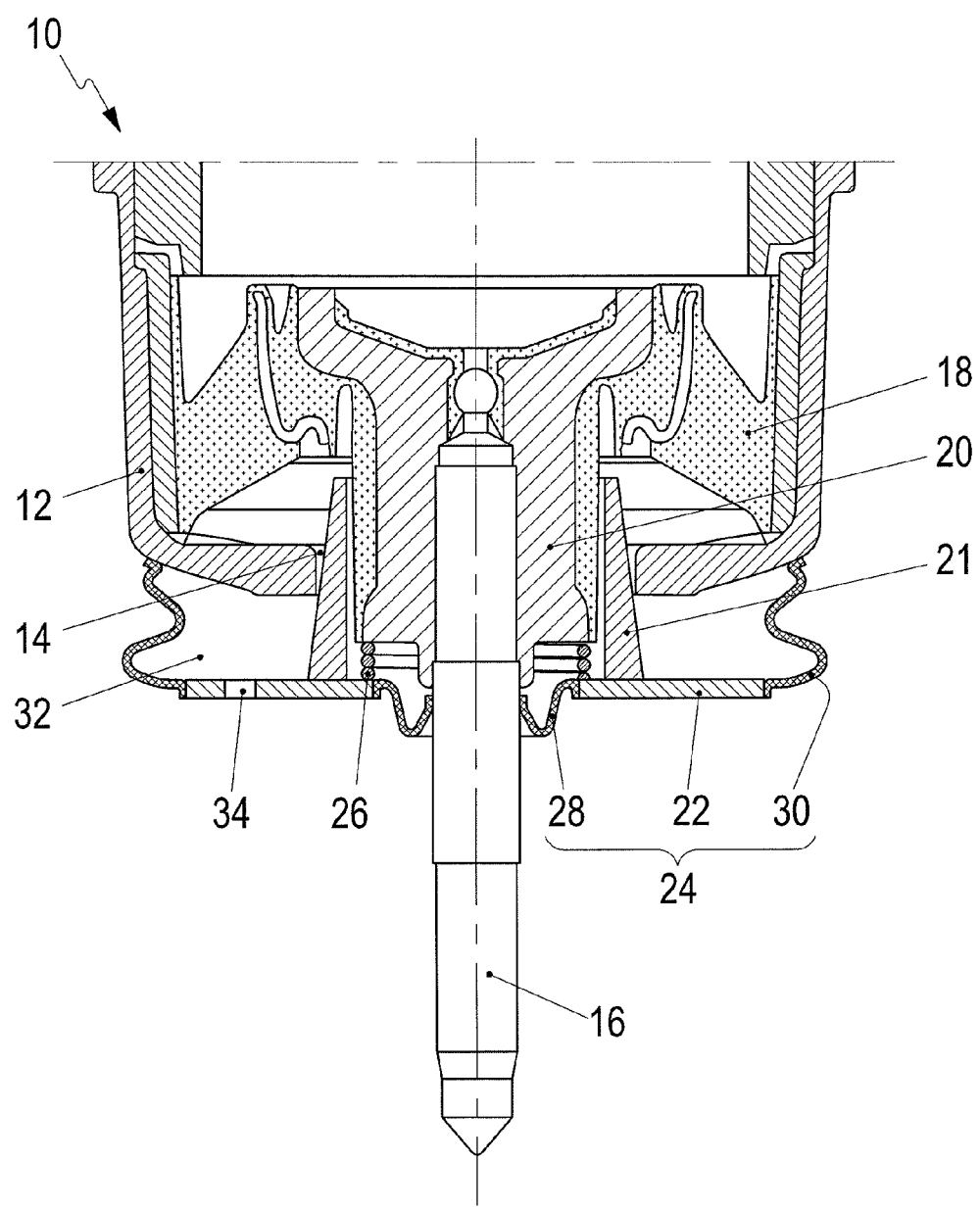

BRIEF DESCRIPTION OF THE DRAWINGS to The invention will be discussed by way of example below with reference to the appended drawings and on the basis of preferred exemplary embodiments, wherein the features presented below may each individually or combinatively constitute an aspect of the invention. In the drawings:

FIG. 1 shows a schematic sectional view of an assembly mount in a position with large clearance, and FIG. 2 shows a schematic sectional view of the assembly mount from FIG. 1 in a position with small clearance.

DETAILED DESCRIPTION OF THE INVENTION

The assembly mount 10 illustrated in FIG. 1 has a housing 12 with a housing opening 14 via which a fastening bolt 16 projects into the interior of the housing 12. To the housing 12 there is connected a load-bearing spring 18 which is produced partially from an elastomer and which has a steel insert 20, the latter being insert-molded into the elastomer and being fixedly connected to the fastening bolt 16. A hollow conical compensation element 21 is guided on the fastening bolt 16 in the longitudinal direction of the fastening bolt 16, which compensation element, in the initial position illustrated, projects by way of its section of relatively small material thickness into the housing opening 14.

The compensation element 21 is fastened to a holding plate 22 of a pressure chamber wall 24. The steel insert 20 of the load-bearing spring 18 and of the holding plate 22 is engaged on by a restoring spring 26 in the form of a helical spring, which restoring spring automatically moves the pressure chamber wall 24 into the illustrated initial position in which the fastening bolt 16 has a large clearance in the housing opening 14. The pressure chamber wall 24 has a flexible inner bellows 28 which seals off the holding plate 22 with respect to the fastening bolt 16. Furthermore, the pressure chamber wall 24 has a flexible outer bellows 30 which seals off the holding plate 22 with respect to the housing 12. In this way, the pressure chamber wall 24, the housing 12 and the load-bearing spring 18 delimit a pressure chamber 32 which is accessible only via a connection opening 34 provided in the holding plate 22.

If a negative pressure is applied in the pressure chamber 32 via the connection opening 34, the pressure chamber 32 can contract as illustrated in FIG. 2. In this case, the holding plate 22 of the pressure chamber wall 24 can be moved, counter to the spring force of the restoring spring 26, toward the load-bearing spring 18, whereby the compensation element 21 can protrude by way of a section of relatively large material thickness into the housing opening 14 and can thereby reduce or even eliminate the clearance of the fastening bolt 16 in the housing opening 14.

What is claimed is:

1. An assembly mount for the movable fastening of a motor vehicle assembly, said assembly mount comprising:
   a housing which is connectable to a motor vehicle body,
   a fastening bolt positioned at least partially within the housing and which projects in a longitudinal direction outside of the housing via a housing opening to connect to the motor vehicle assembly,
   a load-bearing spring which is connected to the housing and to the fastening bolt, wherein the load-bearing spring permits relative movement of the fastening bolt in the longitudinal and radical directions within the housing opening, and
   a compensation element which is movable relative to the housing and relative to the fastening bolt and which serves for varying a movement clearance in the radical direction of the fastening bolt in the housing opening.

2. The assembly mount as claimed in claim 1, wherein the compensation element is connected to a pressure chamber wall, wherein the pressure chamber wall is configured to be moved relative to the housing and relative to the fastening bolt in the longitudinal direction of the fastening bolt by the application of pressure.

3. The assembly mount as claimed in claim 2, wherein the compensation element is connected to a holding plate, which has a connection opening for the connection of a pressure medium, of the pressure chamber wall, wherein the fastening bolt extends through a passage opening of the holding plate, wherein a flexible inner bellows for sealing off the passage opening is connected to the fastening bolt and to the holding plate, and a flexible outer bellows for sealing off a pressure chamber which is delimited by the pressure chamber wall is connected to the holding plate and to the housing.

4. The assembly mount as claimed in claim 2, further comprising a pressure chamber within the housing, which pressure chamber is delimited by the pressure chamber wall, is sealed off by the load-bearing spring.

5. The assembly mount as claimed in claim 1, wherein the compensation element is displaceable in the longitudinal direction, and wherein the compensation element has a cross section which varies in the longitudinal direction.

6. The assembly mount as claimed in claim 1, wherein the compensation element is a sleeve which surrounds the fastening bolt and which has an outer diameter which varies in the longitudinal direction, wherein, the compensation element has a wall which is wedge-shaped in the longitudinal direction.

7. The assembly mount as claimed in claim 1, further comprising a restoring spring which acts on the compensation element for positioning the compensation element into a defined initial position.

8. The assembly mount as claimed in claim 1, wherein the load-bearing spring projects into the housing opening.

9. The assembly mount as claimed in claim 1, wherein the motor vehicle assembly is a motor vehicle engine.

10. The assembly mount as claimed in claim 1, wherein the load-bearing spring is in the form of an elastomer block.

* * * * *